United States Patent
Blaney et al.

(10) Patent No.: US 10,443,851 B2
(45) Date of Patent: Oct. 15, 2019

(54) SELF-PUMPING FUEL INJECTOR FOR A GAS TURBINE ENGINE AND METHOD OF OPERATION

(71) Applicant: United Technologies Corporation, Farmington, CT (US)

(72) Inventors: Ken F. Blaney, Middleton, NH (US); Stephen K. Kramer, Cromwell, CT (US)

(73) Assignee: United Technologies Corporation, Farmington, CT (US)

( * ) Notice: Subject to any disclaimer, the term of this patent is extended or adjusted under 35 U.S.C. 154(b) by 503 days.

(21) Appl. No.: 15/105,381

(22) PCT Filed: Dec. 19, 2014

(86) PCT No.: PCT/US2014/071609
§ 371 (c)(1),
(2) Date: Jun. 16, 2016

(87) PCT Pub. No.: WO2005/095763
PCT Pub. Date: Jun. 25, 2015

(65) Prior Publication Data
US 2016/0327274 A1 Nov. 10, 2016

Related U.S. Application Data

(60) Provisional application No. 61/918,452, filed on Dec. 19, 2013.

(51) Int. Cl.
*F23R 3/28* (2006.01)
*F02C 7/22* (2006.01)
(Continued)

(52) U.S. Cl.
CPC .................. *F23R 3/28* (2013.01); *F02C 3/04* (2013.01); *F02C 7/22* (2013.01); *F02C 7/236* (2013.01);
(Continued)

(58) Field of Classification Search
CPC .... F23R 3/28; F23R 2900/03281; F23K 5/04; F23K 5/142; F02C 7/22; F02C 7/236
See application file for complete search history.

(56) References Cited

U.S. PATENT DOCUMENTS

| | | |
|---|---|---|
| 1,877,350 A | 9/1932 | Harry et al. |
| 2,131,936 A | 10/1938 | Del et al. |

(Continued)

FOREIGN PATENT DOCUMENTS

| | | |
|---|---|---|
| GB | 737611 A | 9/1955 |
| KR | 20050015051 A | 2/2005 |
| WO | WO2013180424 A1 | 12/2013 |

OTHER PUBLICATIONS

EP search report for EP14871363.7 dated Dec. 6, 2016.

*Primary Examiner* — Arun Goyal
(74) *Attorney, Agent, or Firm* — O'Shea Getz P.C.

(57) ABSTRACT

A self-pumping fuel injector includes a pump and a motor for, in-part, delivering fuel to a combustor at higher fuel pressures during start-up and ramping-up conditions. Each pump may include a stationary flow interuptor that intermittently and variably supplies fuel to a rotating spindle that, in-turn, expels the fuel into a nozzle of the injector for improve fuel spray distributions.

14 Claims, 5 Drawing Sheets

(51) Int. Cl.
  *F23K 5/04* (2006.01)
  *F02C 7/236* (2006.01)
  *F02C 3/04* (2006.01)
  *F23K 5/14* (2006.01)
  *F23D 11/26* (2006.01)

(52) U.S. Cl.
  CPC ............. *F23D 11/26* (2013.01); *F23K 5/04* (2013.01); *F23K 5/142* (2013.01); *F05D 2250/25* (2013.01); *F05D 2260/85* (2013.01)

(56) References Cited

U.S. PATENT DOCUMENTS

| | | |
|---|---|---|
| 4,375,745 A | 3/1983 | Schelp |
| 5,975,433 A | 11/1999 | Hasegawa et al. |
| 6,164,554 A * | 12/2000 | Pfister .................. B60H 1/2203 237/12.3 C |
| 7,896,620 B1 | 3/2011 | Ewing, Jr. |
| 2005/0039463 A1 | 2/2005 | Condevaux et al. |
| 2009/0320481 A1 | 12/2009 | Scully |
| 2012/0271527 A1 | 10/2012 | Zebrowski et al. |

* cited by examiner

SELF-PUMPING FUEL INJECTOR FOR A GAS TURBINE ENGINE AND METHOD OF OPERATION

This application claims priority to U.S. Patent Appln. No. 61/918,452 filed Dec. 19, 2013.

BACKGROUND

This application claims priority to PCT Patent Application No. PCT/US14/071609 filed Dec. 19, 2014 which claims priority to U.S. Patent Application No. 61/918,452 filed Dec. 19, 2013, which are hereby incorporated herein by reference in their entireties.

Gas turbine engines, such as those that power modern commercial and military aircraft, include a compressor section to pressurize a supply of air, a combustor section to burn a hydrocarbon fuel in the presence of the pressurized air, and a turbine section to extract energy from the resultant combustion gases and generate thrust. All sections operating in unison under a wide variety of flight conditions including, but not limited to, idle, take-off, cruise, and deceleration.

The combustor section generally includes a fuel system having a plurality of circumferentially distributed fuel injectors that axially project into a combustion chamber to supply fuel to be mixed with the pressurized air. This fuel supply through the injectors must be controlled by the fuel system to meet the demands of the various flight conditions while maintaining engine efficiency and minimizing emissions. To do so, fuel systems may include complicated and heavy hydromechanical devices that may include a plurality of multi-staged fuel manifolds, isolation or servo valves between individual injectors and the manifolds, low and high pressure fuel pumps delivering and bypassing fuel to the manifolds, and a wide array of electronic control features.

Unfortunately, even with such complex and expensive systems, operation of individual fuel injectors is limited to fuel pressures and flows from the upstream manifolds, and fuel isolation provided by the interposed servo valves. Controlling (ramping up or down) of fuel flow through each individual injector, or individually tuning a fuel injector, to further refine operating performance is generally not available. Yet further, fuel atomization under start-up and low power conditions is limited by available fuel pressure.

SUMMARY

A self-pumping fuel injector for a gas turbine engine according to one non-limiting embodiment of the present disclosure includes a nozzle, and an integral pump constructed and arranged to deliver fuel to the nozzle.

Additionally to the foregoing embodiment, the pump is a rotating pump.

In the alternative or additionally thereto, in the foregoing embodiment a drive device operably connects to the pump.

In the alternative or additionally thereto, in the foregoing embodiment the drive device and the pump are rotatably coupled.

In the alternative or additionally thereto, in the foregoing embodiment the drive device is an electric motor.

In the alternative or additionally thereto, in the foregoing embodiment the pump has a housing and a spindle rotateably supported by the housing along a rotational axis.

In the alternative or additionally thereto, in the foregoing embodiment the housing defines a fuel outlet disposed concentric to the rotational axis.

In the alternative or additionally thereto, in the foregoing embodiment the injector further includes an end portion of the spindle disposed at the fuel outlet and defining at least in-part a helical passage in communication with the fuel outlet, an axially extending channel defined by the spindle, a fuel inlet defined by the housing, and wherein the central channel communicates between the fuel inlet and the helical passage.

In the alternative or additionally thereto, in the foregoing embodiment the injector further includes a radial outer surface of the spindle, a radial inner surface of the spindle defining the channel, an inlet port defined by the spindle, and wherein the inlet port communicates through the outer and inner surfaces and communicates between the fuel inlet and the channel.

In the alternative or additionally thereto, in the foregoing embodiment the injector further includes an outlet port defined by the end portion and communicating between the helical passage and the channel, and wherein the helical passage communicates between the fuel outlet and the outlet port.

In the alternative or additionally thereto, in the foregoing embodiment the helical passage is defined by the outer surface and the housing.

In the alternative or additionally thereto, in the foregoing embodiment the injector further includes a fuel inlet and a fuel outlet defined by the housing, a helical passage defined at least in-part by the spindle and orientated to spiral concentrically about the axis, and wherein the helical passage is in continuous communication with the fuel outlet and is in intermittent communication with the fuel inlet as the spindle rotates.

In the alternative or additionally thereto, in the foregoing embodiment the injector further includes a drive device, the spindle having and extending axially from a first end portion, a mid portion, and an opposite second end, and wherein the second end portion is engaged to the drive device, the first end portion is at least in-part in the fuel outlet, and the mid portion defines an inlet port being in intermittent communication with the fuel inlet and continuous communication with the helical passage.

In the alternative or additionally thereto, in the foregoing embodiment the injector further includes the housing defining a fuel chamber in communication with the fuel inlet, a flow interuptor of the pump engaged rigidly to the housing and radially disposed adjacent to the mid portion in the fuel chamber, a port defined by and communicating radially through the flow interuptor, and wherein the port is in continuous communication with the fuel inlet and in intermittent communication with the helical passage as the spindle rotates.

In the alternative or additionally thereto, in the foregoing embodiment a bearing of the pump is radially disposed between the housing and the spindle and in the fuel chamber.

In the alternative or additionally thereto, in the foregoing embodiment the injector further includes a retainer of the pump engaged to the housing, and wherein the bearing and the flow interuptor are disposed radially between the retainer and the spindle.

In the alternative or additionally thereto, in the foregoing embodiment an annular sub-chamber of the chamber is defined radially between the retainer and the housing and is constructed and arranged to retain fuel to cool the pump.

In the alternative or additionally thereto, in the foregoing embodiment the pump has an impeller concentrically connected to the spindle.

In another non-limiting embodiment of the present disclosure a method of operating a self-pumping fuel injector for a gas turbine engine includes the steps of powering a drive device of the self-pumping fuel injector, operating a pump of the self-pumping fuel injector through the drive device, and flowing fuel from the pump and through a fuel nozzle of the fuel injector.

In addition to the foregoing embodiment, the method has the further step of increasing drive device speed to increase flow through the fuel nozzle.

In the alternative or addition thereto, in the foregoing embodiment the method includes the additional step of increasing drive device speed to increase fuel pressure in the fuel nozzle.

The foregoing features and elements may be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

Various features will become apparent to those skilled in the art from the following detailed description of the disclosed non-limiting embodiments. The drawings that accompany the detailed description are briefly described as follows.

DETAILED DESCRIPTION

Figure 1:
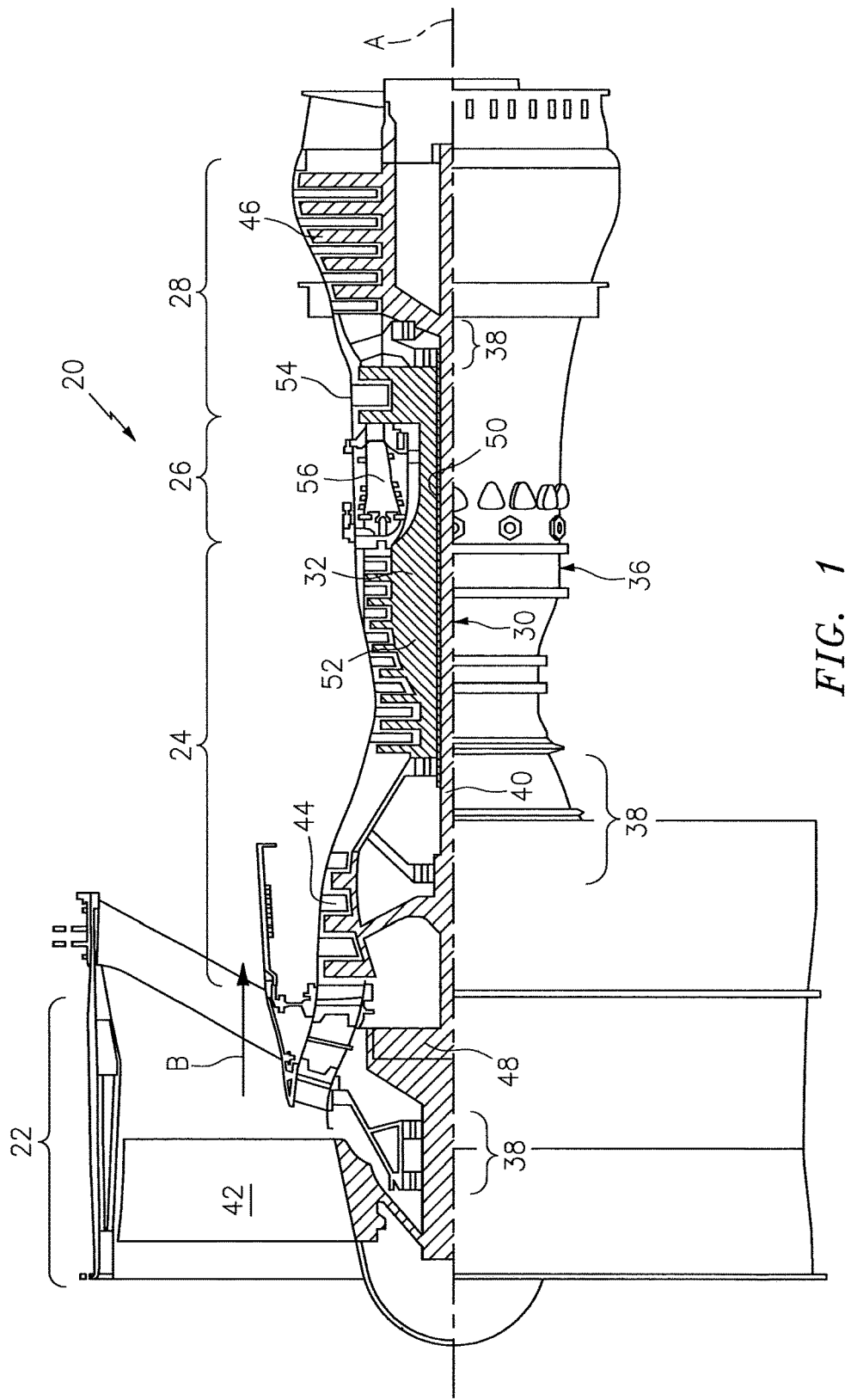
FIG. 1 is a schematic cross-section of a gas turbine engine.

FIG. 1 schematically illustrates a gas turbine engine 20. The gas turbine engine 20 is disclosed herein as a two-spool turbo fan that generally incorporates a fan section 22, a compressor section 24, a combustor section 26 and a turbine section 28. Alternative engines might include an augmentor section (not shown) among other systems or features. The fan section 22 drives air along a bypass flowpath while the compressor section 24 drives air along a core flowpath for compression and communication into the combustor section 26 then expansion through the turbine section 28.

The engine 20 generally includes a low spool 30 and a high spool 32 mounted for rotation about an engine central longitudinal axis A relative to an engine static structure 36 or engine case via several bearing structures 38. The low spool 30 generally includes an inner shaft 40 that interconnects a fan 42 of the fan section 22, a Low Pressure Compressor 44 ("LPC") of the compressor section 24 and a Low Pressure Turbine 46 ("LPT") of the turbine section 28. The inner shaft 40 drives the fan 42 directly or through a geared architecture 48 to drive the fan 42 at a lower speed than the low spool 30. An exemplary reduction transmission is an epicyclic transmission, namely a planetary or star gear system.

The high spool 32 includes an outer shaft 50 that interconnects a High Pressure Compressor 52 ("HPC") of the compressor section 24 and a High Pressure Turbine 54 ("HPT") of the turbine section 28. A combustor 56 of the combustor section 26 is arranged between the HPC 52 and the HPT 54. The inner shaft 40 and the outer shaft 50 are concentric and rotate about the engine central longitudinal axis A that is collinear with their longitudinal axes.

Core airflow is compressed by the LPC 44 then the HPC 52, mixed with the fuel and burned in the combustor 56, then expanded over the HPT 54 and the LPT 46. The LPT 46 and HPT 54 rotationally drive the respective low spool 30 and high spool 32 in response to the expansion. Although depicted as a turbofan in the disclosed non-limiting embodiment, it should be understood that the concepts described herein are not limited to use with turbofans as the teachings may be applied to other types of turbine engines such as a turbojets, turboshafts, and three-spool (plus fan) turbofans wherein an intermediate spool includes an Intermediate Pressure Compressor ("IPC") between a LPC and a HPC, and an Intermediate Pressure Turbine ("IPT") between a HPT and a LPT.

In one non-limiting example, the gas turbine engine 20 is a high-bypass geared aircraft engine. In a further example, the gas turbine engine 20 bypass ratio is greater than about six (6:1). The geared architecture 48 can include an epicyclic gear train, such as a planetary gear system or other gear system. The example epicyclic gear train has a gear reduction ratio of greater than about 2.3:1, and in another example is greater than about 2.5:1. The geared turbofan enables operation of the low spool 30 at higher speeds that can increase the operational efficiency of the LPC 44 and LPT 46 and render increased pressure in a fewer number of stages.

A pressure ratio associated with the LPT 46 is pressure measured prior to the inlet of the LPT 46 as related to the pressure at the outlet of the LPT 46 prior to an exhaust nozzle of the gas turbine engine 20. In one non-limiting embodiment, the bypass ratio of the gas turbine engine 20 is greater than about ten (10:1), the fan diameter is significantly larger than that of the LPC 44, and the LPT 46 has a pressure ratio that is greater than about five (5:1). It should be understood, however, that the above parameters are only exemplary of one embodiment of a geared architecture engine and that the present disclosure is applicable to other gas turbine engines including direct drive turbofans.

In one embodiment, a significant amount of thrust is provided by the bypass flow path B due to the high bypass ratio. The fan section 22 of the gas turbine engine 20 is designed for a particular flight condition—typically cruise at about 0.8 Mach and about 35,000 feet. This flight condition, with the gas turbine engine 20 at its best fuel consumption, is also known as bucket cruise Thrust Specific Fuel Consumption (TSFC). TSFC is an industry standard parameter of fuel consumption per unit of thrust.

Fan Pressure Ratio is the pressure ratio across a blade of the fan section 22 without the use of a Fan Exit Guide Vane system. The low Fan Pressure Ratio according to one non-limiting embodiment of the example gas turbine engine 20 is less than 1.45. Low Corrected Fan Tip Speed is the actual fan tip speed divided by an industry standard temperature correction of ("T"/$518.7^{0.5}$) in which "T" represents the ambient temperature in degrees Rankine. The Low Corrected Fan Tip Speed according to one non-limiting embodiment of the example gas turbine engine 20 is less than about 1150 fps (351 m/s).

Figure 2:
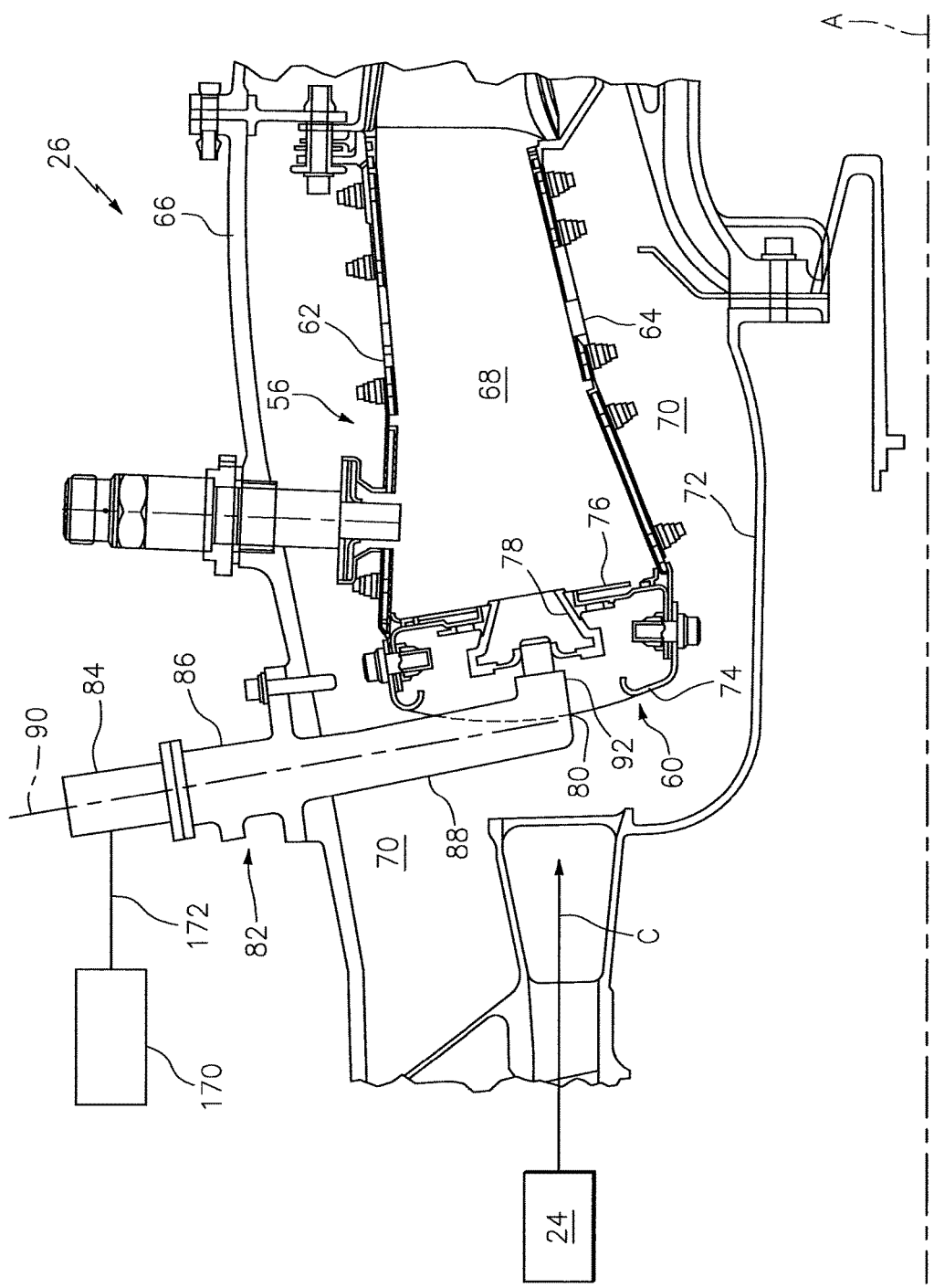
FIG. 2 is a partial longitudinal schematic cross-section of a combustor section according to one non-limiting embodiment that may be used with the gas turbine engine shown in FIG. 1

With reference to FIG. 2, the combustor 56 may be annular in shape, concentrically disposed to axis A, and may generally include a bulkhead assembly 60, an outer wall 62, an inner wall 64, and a diffuser case module 66. The outer and inner walls 62, 64 project axially in a downstream direction from the bulkhead assembly 60, and radially define an annular combustion chamber 68 therebetween. An annular cooling plenum 70 is generally defined radially between the outer diffuser case module 66 and a diffuser inner case 72. The bulkhead assembly 60 and walls 62, 64 are located in the cooling plenum 70 immediately downstream from the compressor section 24.

The annular bulkhead assembly 60 extends radially between, and in this disclosed non-limiting embodiment, is secured to the forward most ends of the walls 62, 64. Assembly 60 generally includes an annular hood 74, a wall or heat shield 76 that defines the axial upstream end of the combustion chamber 68, and a plurality of swirlers 78 (one shown) spaced circumferentially about engine axis A and generally projecting or communicating through the wall 76. A plurality of circumferentially distributed hood ports 80 accommodate a respective plurality of self-pumping fuel injectors 82 as well as direct compressed air C into the forward end of the combustion chamber 68 through the associated swirler 78.

The bulkhead assembly 60 introduces core combustion air into the upstream end of the combustion chamber 68 while dilution and cooling air is introduced into the combustion chamber 68 through the walls 62, 64 and from the plenum 70. The plurality of fuel injectors 82 and respective swirlers 78 facilitate the generation of a blended fuel-air mixture that supports combustion in the combustion chamber 68.

Each fuel injector 82 is self-pumping and may include a drive device 84, a pump 86 and a fuel nozzle 88 all substantially orientated along a rotational axis 90. The pump 86 is generally mounted between an external surface of the diffuser case module 66 and the drive device 84 along the axis 90. The elongated fuel nozzle 88 may substantially extend longitudinally along the axis 90 from the pump 86, through the diffuse case module 66 and into the cooling plenum 70. A distal end portion 92 of the nozzle 88 projects radially outward with respect to axis 90 and through one of the hood ports 80 and into the respective swirler 78 for generally distributing and atomizing fuel therein.

Figure 3:
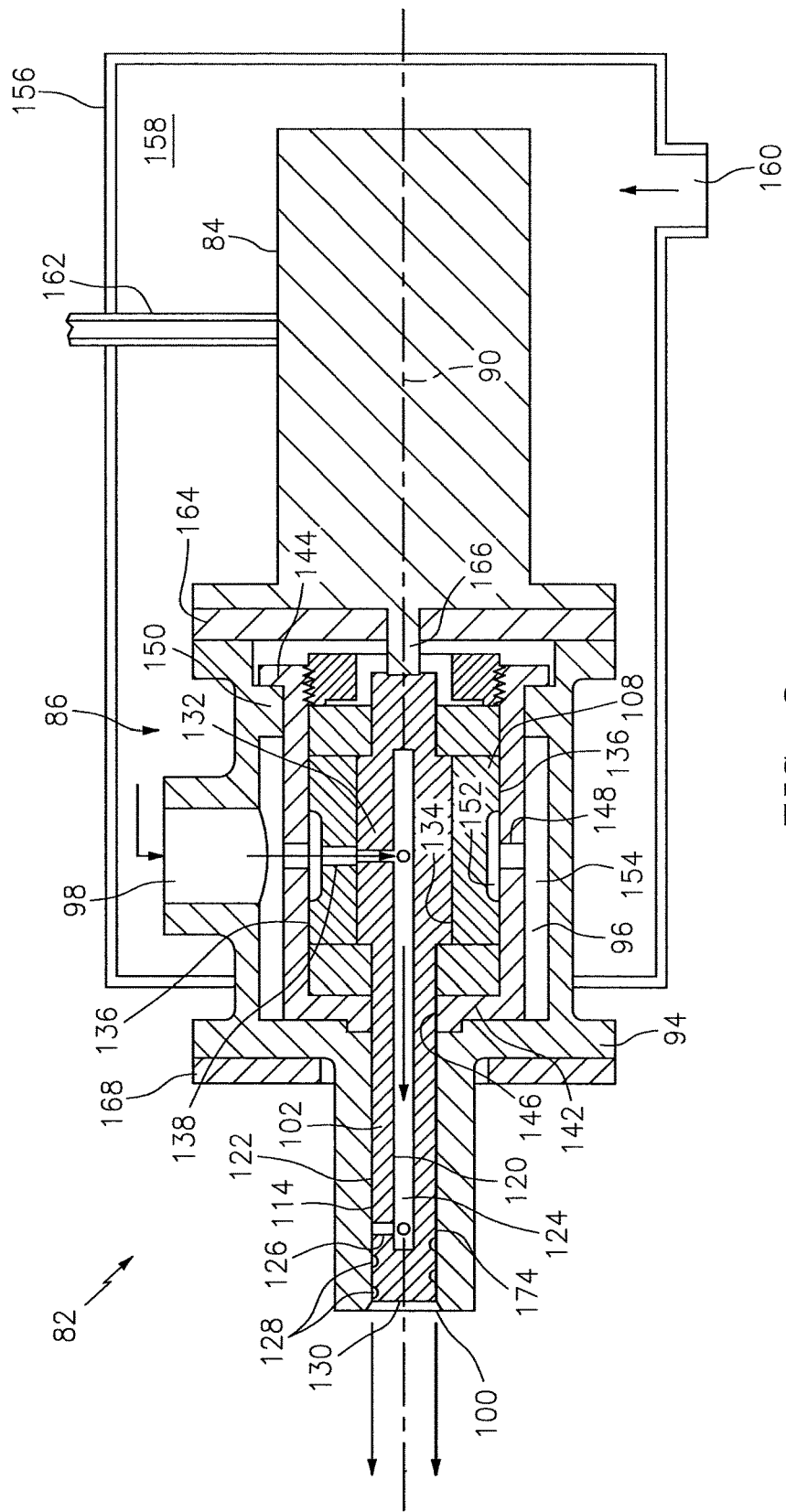
FIG. 3 is a cross section of a fuel pump and motor of a fuel injector.
Figure 4:
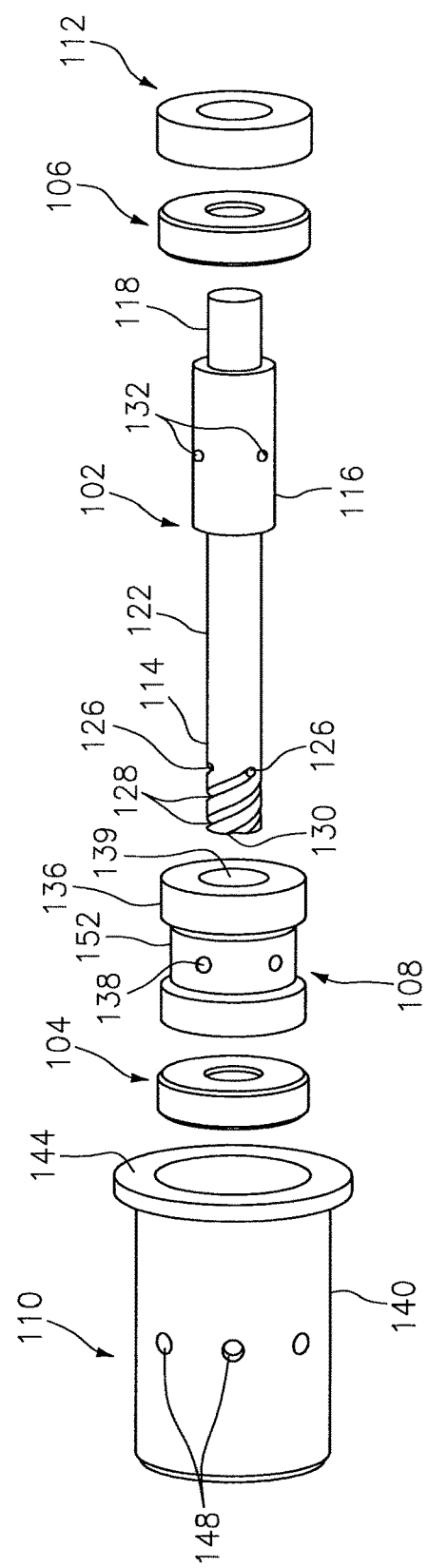
FIG. 4 is an exploded perspective view of the fuel pump with a housing removed to show internal detail; and, FIG. 5 is a schematic view of a second, non-limiting, embodiment of a self-pumping fuel injector.
Figure 5:
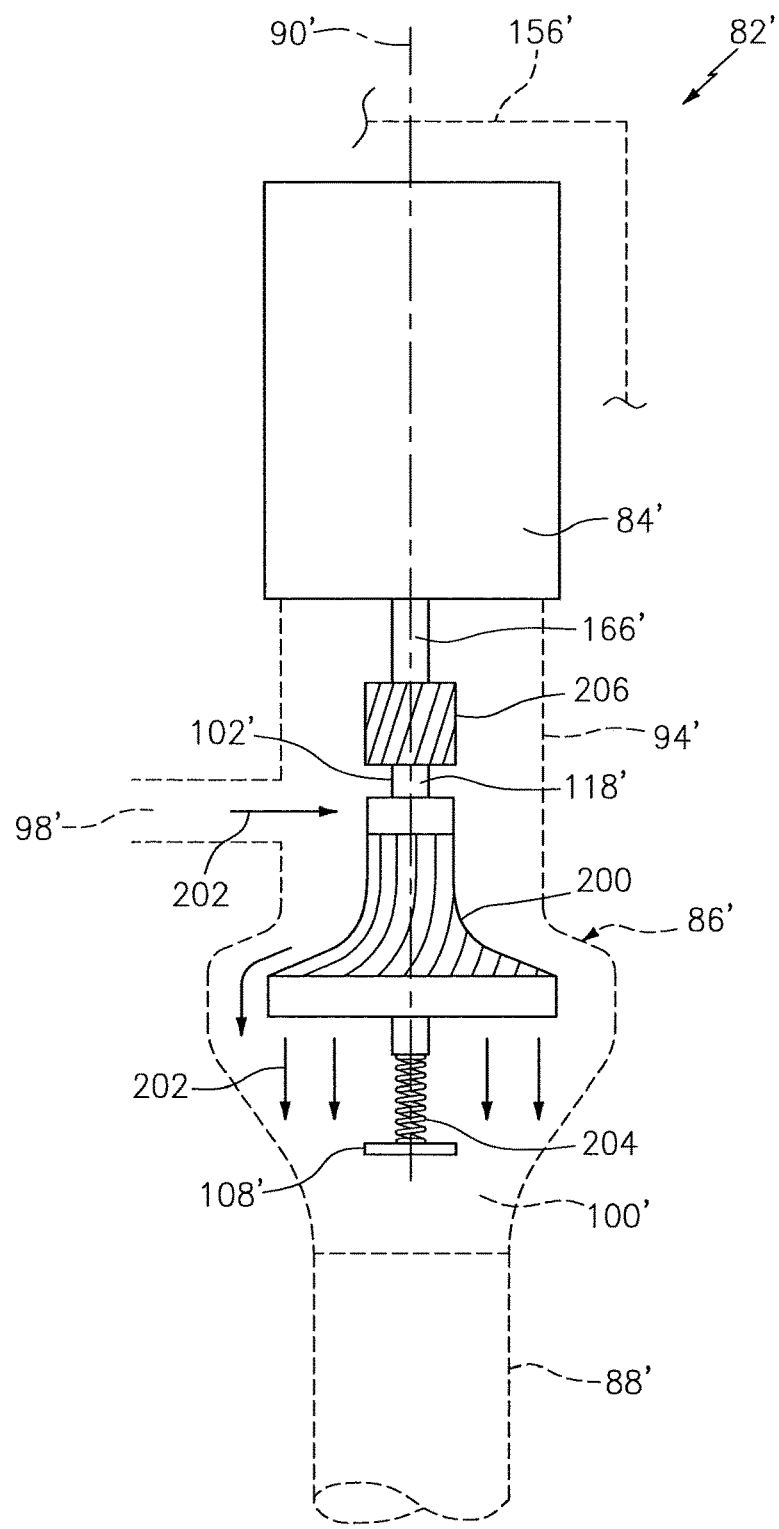

Referring to FIGS. 3 and 4, the pump 86 of the self-pumping fuel injector 82 generally includes a housing 94 that defines a fuel chamber 96, a fuel inlet 98 and a fuel outlet 100. In the chamber 96, the pump 86 further has a spindle 102, fore and aft bearings 104, 106, a flow interuptor 108, a bearing retainer 110 and an axial retaining nut or fastener 112. The spindle 102 has a first end portion 114, a mid-portion 116 and an opposite second end portion 118. The spindle 102 generally carries radial inner and outer surfaces 120, 122, wherein the inner surface 120 defines a fuel channel 124 substantially orientated concentric to axis 90.

The first end portion 114 has a plurality of outlet ports 126 that radially extend through the inner and outer surfaces 120, 122 and communicate between the channel 124 and a respective helical passage 128 (two shown). The helical passages 128 may be grooves carried by the outer surface 122, and thereby defined between the housing 94 and the outer surface 122 of the spindle 102. The passages 128 are evenly spaced from one-another and each extend in a spiraling direction from the respective outlet port 126, about the outer surface 122, and generally through a distal end face 130 of the end portion 114. It is understood and contemplated that each helical passage 128 may be internal to the end portion 114; however, constructed as grooves contributes toward ease of manufacturing and adds or creates a fuel cooling film 174 between the housing 94 and the end portion 114 that promotes rotation of the spindle 102.

The mid-portion 116 of the spindle 102 carries a plurality of inlet ports 132 that are equally spaced circumferentially from one-another, extend radially through the surfaces 120, 122, and communicate with the channel 124. The flow interuptor 108 is generally ring shaped and extends circumferentially around, and generally extends along the axial length of the mid-portion 116. The interuptor 108 has radial inner and outer surfaces 134, 136 and at least one port 138 that communicates radially through the inner and outer surfaces 134, 136. The mid-portion 116 fits slideably into a through bore 139 of the flow interuptor 108 defined by the inner surface 134. The flow interuptor 108 may be stationary with respect to the housing 94 so that as the spindle 102 rotates the plurality of inlet ports 132 of the spindle 102 are in intermittent communication with the port 138 of the flow interuptor 108.

The bearing retainer or cup 110 is generally shaped like a cylindrical cup, and substantially surrounds and retains the bearings 104, 106 and the flow interuptor 108. The retainer 110 has a cylindrical wall 140, a annular rim 142 that projects radially inward from one end of the wall 140, a flange 144 that projects radially outward from an opposite end of the wall 140, a hole 146 defined by the rim 142 and through which the spindle 102 projects, and a plurality of circumferentially spaced ports 148 in the wall 140. When the pump 86 is assembled, the rim 142 axially abuts the housing 94 in a downstream direction and the bearing 104 axially abuts an opposite upstream side of the rim 142. The flow interuptor 108 spans axially between and abuts to the bearings 104, 106. The nut 112 is located immediately aft or upstream of the bearing 106 and may have external threads for threadable engagement to the retainer 110 for holding the internal components in place. It is further understood and contemplated that the nut may be any form of fastener that engages to the retainer 110 for the purpose of holding the internal components to the retainer in the appropriate axial position. The flange 144 of the housing 94 axially abuts a rib 150 of the housing 94 that projects radially inward. Generally, the retainer 110 is in contact with the housing to maintain proper radial and axial alignment of the internal components.

A portion of the outer surface 136 of the flow interuptor 108 may be fitted snugly to an inner cylindrical face of the retainer 140. Another portion of the surface 136 defines a recess 152 located at about an axial mid-point of the flow interuptor 108. The recess 152 creates an annular space between the retainer 140 and the flow interuptor 108 that is circumferentially continuous and provides communication between the ports 138 of the flow interuptor 108 and the ports 148 of the retainer 110. It is further understood and contemplated that if the ports 138 and ports 148 were axially and circumferentially aligned to one-another, the recess 152 may be omitted from the flow interuptor 108.

To provide cooling for both the pump 86 and the motor 84, an annular sub-chamber 154 of the chamber 96 is defined radially between the housing 94 and the retainer 110. The sub-chamber 154 communicates directly with the fuel inlet 98 and acts as a manifold for supplying fuel to each one of the plurality of ports 148 of the retainer 110. The pump 86 and motor 84 may be further cooled through the use of fuel by a shell 156 that substantially encapsulates the pump and motor thus creating a cooling reservoir 158 of fuel. The shell 156 has a fuel inlet 160 strategically located so that fuel flows or circulates about the pump and motor before entering the fuel inlet 98 of the housing 94. Moreover, the fuel flow through the channel 124 that axially extends along a substantial length of the spindle 102 will help to minimize any heat conduction through the spindle and to the motor 84.

The motor 84 mounts to the aft end of housing 94 with a gasket or seal plate 164 disposed therebetween. The motor 84 has a rotor 166 centered to the axis 90 and releasably engaged (e.g. keyed or splined connection) to the upstream end portion 118 of the spindle 102. The housing 94 mounts the diffuser case module 66 with a gasket 168 therebetween that acts as a thermal barrier. The shell 156 may have a conduit 162 for routing electrical power to the motor 84.

In operation, a controller 170 delivers a signal 172 (see FIG. 2) that controls electric power to, and thus speed of the motor 84. Increasing speed generally increase fuel flow through the fuel outlet 100 and at a substantially constant pressure. Fuel may enter the pump 86 from the fuel cooling reservoir 158, through the housing fuel inlet 98 and into the fuel cooling sub-chamber 154. From the sub-chamber 154, fuel enters the recess 152 of the flow interruptor 108 through the plurality of ports 148 in the retainer 110. As the spindle 102 rotates at a speed dictated by the motor 84 the ports 132 rotatably pass by the ports 138 in the stationary flow interruptor 108. This 'passing by' creates the intermittent communication and thus controlled fuel flow into the channel 124, then through the ports 126 and the helical passages 128 of the spindle 102. The relationship between the spindle 102, the flow interrupter 108 and the speed or revolutions per minute ("RPM") determines the fuel delivery rate. The flow is generally driven by the orientation of the helical passages 128 combined with the spindles rotational movement that creates a centrifugal force which pushes the fuel out through the housing outlet 100. At the downstream end portion 122 of the spindle 102, the passages 128 (i.e. grooves) are open to an interior wall of the housing 94, consequently fuel through the passages also enable the formation of the fuel cooling film 174 between the end portion 122 and the housing 94 that minimizes friction and promotes rotation.

Because the spindles 102 of each fuel injector 82 are individually spun by respective electric motors 84 fuel spray distributions are improved over more traditional fuel injectors, thus improving engine start-up. That is, fuel distribution becomes less dependent on the number of orifices in a nozzle, thus the number of orifices may be reduced because the fuel pressure can be increased. Operating at higher pressure during start-up greatly improves spray atomization and distribution. Because the motors are variable speed and due to the relationship between the flow interuptor 108 and the spindle 102 as previously described, power consumption is kept to a minimum.

Referring to 5, a second embodiment of a self-pumping fuel injector is illustrated wherein like elements to the first embodiment have like identifying numerals except with the addition of a prime symbol. The fuel injector 82' has an impeller pump 86' having a spindle 102' having an end portion 118' connected to a rotor 166' of a drive device or motor 84' along a rotational axis 90'. The motor 84' and pump 86' may be encase by a shell 156' containing supply fuel for cooling. An impeller 200 is concentrically attached to the spindle 102' for flowing fuel in the direction of arrows 202 from a fuel inlet 98' of a pump housing 94' to an outlet 100', thereby feeding fuel to a fuel nozzle 88'.

A flow interuptor 108' operates to shut off fuel when the pump device 84' is not operating. The interuptor 108' may have a spring 204 that exerts a biasing force axially against the spindle 102' and toward the drive device 84'. A coupling 206 of the interuptor 108', located between the rotor 166' and the end portion 118' of the spindle 102', may be a helical spline that generates axial movement of the spindle 102'. During operation, the centrifugal force of the spinning spindle overcomes the axial biasing force of the spring 204 and thereby acts to open communications between the fuel inlet 98' and the fuel outlet 100'.

It should be understood that relative positional terms such as "forward," "aft," "upper," "lower," "above," "below," and the like are with reference to the normal operational attitude and should not be considered otherwise limiting.

It should be understood that like reference numerals identify corresponding or similar elements throughout the several drawings. It should also be understood that although a particular component arrangement is disclosed in the illustrated embodiment, other arrangements will benefit herefrom.

Although particular step sequences are shown, described, and claimed, it should be understood that steps may be performed in any order, separated or combined unless otherwise indicated and will still benefit from the present disclosure.

The foregoing description is exemplary rather than defined by the limitations within. Various non-limiting embodiments are disclosed herein, however, one of ordinary skill in the art would recognize that various modifications and variations in light of the above teachings will fall within the scope of the appended claims. It is therefore to be understood that within the scope of the appended claims, the disclosure may be practiced other than as specifically described. For that reason the appended claims should be studied to determine true scope and content.

What is claimed is:

1. A self-pumping fuel injector for a gas turbine engine, the self-pumping fuel injector comprising:
    a nozzle;
    an integral pump constructed and arranged to deliver fuel to the nozzle, wherein the pump includes a housing and a spindle rotatably supported by the housing along a rotational axis;
    a fuel inlet and a fuel outlet defined by the housing,
    a helical passage defined at least in-part by the spindle and orientated to spiral concentrically about the axis, wherein the helical passage is in continuous communication with the fuel outlet and is in intermittent communication with the fuel inlet as the spindle rotates; and
    a drive device;
    wherein the spindle has and extends axially from a first end portion, a mid portion and a second end portion opposite the first end portion, and
    wherein the second end portion is engaged to the drive device, the first end portion is at least in-part in the fuel outlet, and the mid portion defines an inlet port being in intermittent communication with the fuel inlet and continuous communication with the helical passage.

2. The self-pumping fuel injector set forth in claim 1 wherein the pump is a rotating pump.

3. The self-pumping fuel injector set forth in claim 1 further comprising:
    wherein the drive device is operably connected to the pump.

4. The self-pumping fuel injector set forth in claim 3 wherein the drive device and the pump are rotatably coupled.

5. The self-pumping fuel injector set forth in claim 3 wherein the drive device is an electric motor.

6. The self-pumping fuel injector set forth in claim 1, wherein the fuel outlet is disposed concentric to the rotational axis.

7. The self-pumping fuel injector set forth in claim 1, wherein
the first end portion defines at least in-part the helical passage in communication with the fuel outlet;
an axially extending channel is defined by a radial inner surface of the spindle; and
the axially extending channel communicates between the fuel inlet and the helical passage.

8. The self-pumping fuel injector set forth in claim 7 further comprising:
a radial outer surface of the spindle;
wherein the inlet port communicates through the outer surface and the inner surface and communicates between the fuel inlet and the axially extending channel.

9. The self-pumping fuel injector set forth in claim 8 further comprising:
an outlet port defined by the first end portion and communicating between the helical passage and the axially extending channel; and
wherein the helical passage communicates between the fuel outlet and the outlet port.

10. The self-pumping fuel injector set forth in claim 9 wherein the helical passage is defined by the outer surface and the housing.

11. The self-pumping fuel injector set forth in claim 1, further comprising:
the housing defining a fuel chamber in communication with the fuel inlet;
a flow interrupter of the pump engaged rigidly to the housing and radially disposed adjacent to the mid portion of the spindle in the fuel chamber;
a port defined by and communicating radially through the flow interrupter; and
wherein the port is in continuous communication with the fuel inlet and in intermittent communication with the helical passage as the spindle rotates.

12. The self-pumping fuel injector set forth in claim 11 further comprising a bearing of the pump radially disposed between the housing and the spindle and in the fuel chamber.

13. The self-pumping fuel injector set forth in claim 12 further comprising:
a retainer of the pump engaged to the housing; and
wherein the bearing and the flow interrupter are disposed radially between the retainer and the spindle.

14. The self-pumping fuel injector set forth in claim 13 further comprising an annular sub-chamber of the fuel chamber defined radially between the retainer and the housing constructed and arranged to retain fuel to cool the pump.

* * * * *